United States Patent
Sughrue et al.

(10) Patent No.: US 7,449,104 B2
(45) Date of Patent: Nov. 11, 2008

(54) INTEGRATED CATALYTIC CRACKING AND DESULFURIZATION SYSTEM

(75) Inventors: Edward L. Sughrue, Bartlesville, OK (US); Gil J. Greenwood, Bartlesville, OK (US)

(73) Assignee: ConocoPhilips Company, Houston, TX (US)

( * ) Notice: Subject to any disclaimer, the term of this patent is extended or adjusted under 35 U.S.C. 154(b) by 938 days.

(21) Appl. No.: 10/190,457

(22) Filed: Jul. 5, 2002

(65) Prior Publication Data

US 2004/0004023 A1 Jan. 8, 2004

(51) Int. Cl.
*C10G 11/00* (2006.01)
*C10G 17/00* (2006.01)
*C10G 29/00* (2006.01)
*C10G 25/00* (2006.01)

(52) U.S. Cl. .................... 208/113; 208/208 R; 208/244; 208/247; 208/299

(58) Field of Classification Search ................ 208/113, 208/208 R, 244, 247, 299
See application file for complete search history.

(56) References Cited

U.S. PATENT DOCUMENTS

| | | | |
|---|---|---|---|
| 5,525,210 A | 6/1996 | Wormsbecher et al. | |
| 5,914,292 A | 6/1999 | Khare | 502/406 |
| 6,036,847 A | 3/2000 | Ziebarth et al. | |
| 6,056,871 A | 5/2000 | Khare et al. | 208/250 |
| 6,184,176 B1 | 2/2001 | Khare | 502/407 |
| 6,254,766 B1 | 7/2001 | Sughrue et al. | 208/244 |
| 6,271,173 B1 | 8/2001 | Khare | 502/406 |
| 6,274,533 B1 | 8/2001 | Khare | 502/343 |
| 6,429,170 B1 | 8/2002 | Dodwell | |
| 6,497,811 B1 * | 12/2002 | Myrstad et al. | 208/113 |
| 6,656,877 B2 * | 12/2003 | Sughrue et al. | 502/414 |

FOREIGN PATENT DOCUMENTS

WO    WO 200222763 A1 *  3/2002

* cited by examiner

*Primary Examiner*—Genn Caldarola
*Assistant Examiner*—John C Douglas
(74) *Attorney, Agent, or Firm*—Hovey Williams LLC; Lynda S. Jolly

(57) ABSTRACT

An integrated fluid catalytic cracking (FCC) and desulfurization system for processing hydrocarbon-containing fluids. The integrated system employs a cracking/desulfurization unit having a reactor, a regenerator, and a reducer. A mixture of solid FCC catalyst particulates and solid sulfur sorbent particulates are circulated through the reactor, regenerator, and reducer to provide for substantially continuous cracking and desulfurization of the hydrocarbon-containing fluid, as well as substantially continuous regeneration of both the FCC catalyst and the sulfur sorbent.

6 Claims, 1 Drawing Sheet

INTEGRATED CATALYTIC CRACKING AND DESULFURIZATION SYSTEM

BACKGROUND OF THE INVENTION

This invention relates to a system for catalytically cracking and desulfurizing hydrocarbon-containing fluids. In another aspect, the invention concerns an integrated system for cracking and desulfurizing hydrocarbon-containing fluids in a common cracking/desulfurization unit.

Fluidized catalytic cracking (FCC) units are used in the petroleum industry to convert (i.e., "crack") high boiling point hydrocarbon feedstocks (e.g., gas oils) to more valuable hydrocarbon products (e.g., gasoline) having a lower average molecular weight and a lower average boiling point than the feedstocks from which they were derived. The conversion is normally accomplished by contacting the hydrocarbon feedstock with finely divided solid catalyst particulates at elevated temperatures. The most typical hydrocarbon feedstock treated in FCC units comprises a heavy gas oil, but on occasions such as feedstocks as light gas oils, naphthas, reduced crudes and even whole crudes are subjected to catalytic cracking to yield lower boiling hydrocarbon products.

Catalytic cracking in FCC units is generally accomplished via a cyclic process involving separate zones for catalytic reaction, stripping, and catalyst regeneration. The hydrocarbon feedstock is blended with an appropriate amount of catalyst particles to form a mixture that is then passed to a catalytic reactor, normally referred to as a riser, wherein the mixture is subjected to a temperature between about 800° F. and about 1100° F., normally between about 900° F. and 1050° F., in order to convert the feedstock into gaseous, lower boiling hydrocarbons. After these lower boiling hydrocarbons are separated from the catalyst in a suitable separator, the catalyst, now deactivated by coke deposited upon its surfaces, is passed to a stripper. Here the deactivated catalyst is contacted with a stripping fluid to remove entrained hydrocarbons. The deactivated coke-containing catalyst particles recovered from the stripper are then introduced into a regenerator where the catalyst is reactivated by combusting the coke in the presence of an oxygen-containing gas, such as air, at a temperature which normally ranges between about 1000° F. and 1500° F. The cyclic process is then completed by blending the reactivated catalyst particles with the feedstock entering the reactor of the FCC unit.

The hydrocarbon feedstock to the FCC reactor and the cracked hydrocarbon product from the FCC reactor typically contain quantities of sulfur. If the cracked hydrocarbon product (e.g., cracked-gasoline) from the FCC reactor is employed in the making of automotive fuels, combustion of such fuels in the engine of an automobile may result in a sulfur-containing combustion exhaust that can irreversibly poison the noble metal catalysts in the automobile's catalytic converter. Emissions from such poisoned catalytic converters may contain high levels of non-combusted hydrocarbons, oxides of nitrogen, and/or carbon monoxide, which, when catalyzed by sunlight, form ground level ozone, more commonly referred to as smog. Thus it is desirable for the hydrocarbon products of a FCC unit to have minimal sulfur content.

Many conventional processes exist for removing sulfur from cracked hydrocarbon products (e.g., cracked-gasoline). However, most conventional sulfur removal processes, such as hydrodesulfurization, tend to saturate olefins and aromatics in the cracked hydrocarbon product and thereby reduce its octane number (both research and motor octane number). Thus, there is a need for a process wherein desulfurization of cracked hydrocarbon products is achieved while the octane number is maintained.

Recently, an improved system for removing sulfur from hydrocarbon-containing fluids, such as cracked-gasoline and diesel fuel, has been developed. This system employs fluidizable, regenerable, bifunctional solid sorbent particulates to remove both organic and inorganic sulfur compounds from the hydrocarbon-containing fluid. The desulfurization unit comprises separate reactor, regenerator, and reducer vessels. The sorbent is circulated through the reactor, regenerator, and reducer in a substantially continuous manner. In the reactor, the bifunctional sorbent (comprising a promoter metal component and zinc oxide) is contacted with, and removes sulfur from, the hydrocarbon-containing fluid. The sulfur-loaded sorbent is then transported from the reactor to the regenerator where it is contacted with an oxygen-containing regeneration stream to thereby remove sulfur from the sorbent. The regenerated sorbent is then transported to the reducer where it is contacted with a hydrogen-containing regeneration stream to reduce the promoter metal component. After reduction, the regenerated and reduced sorbent is returned to the reactor for sulfur removal.

In conventional petroleum processing facilities, the FCC and desulfurization units are separate from one another. Thus, different reactor and regenerator vessels are used for the FCC and desulfurization units. However, the construction, operation, and maintenance expense of FCC and desulfurization units could be greatly reduced if fluid catalytic cracking and desulfurization could be carried out in the same vessels, at the same time, and under the same conditions. Such an integrated FCC/desulfurization system would be a significant contribution to the art and to the economy.

SUMMARY OF THE INVENTION

Accordingly, it is one object of the invention to provide an integrated system for cracking and desulfurizing a hydrocarbon-containing fluid using the same reaction and regeneration vessels.

A further object of the present invention is to provide an integrated hydrocarbon cracking and desulfurization system which minimizes octane loss of the cracked/desulfurized hydrocarbon product.

Another object of the present invention is to provide a solid particulate system comprising a mixture of FCC catalyst particulates and sulfur sorbent particulates, wherein the solid particulate system can be used to continuously crack and desulfurize a hydrocarbon-containing fluid in a common reactor vessel and the solid particulate system can be continuously regenerated in a common regenerator vessel.

A still further object of the present invention is to provide an integrated hydrocarbon cracking and desulfurization system wherein the FCC catalyst particulates and the sulfur sorbent particulates can be reacted, regenerated, and/or reduced in common zones, thereby eliminating the need for expensive solids separation equipment.

It should be noted that the above-listed objects need not all be accomplished by the invention claimed herein and other objects and advantages of this invention will be apparent from the following description of the preferred embodiments and appended claims.

Accordingly, in one embodiment of the present invention there is provided a process for simultaneously cracking and desulfurizing a hydrocarbon-containing fluid in a common reaction zone. The cracking/desulfurization process comprises the steps of: (a) contacting the hydrocarbon-containing fluid with an FCC catalyst in the reaction zone under reaction conditions sufficient to crack the hydrocarbon-containing fluid; and (b) contacting the hydrocarbon-containing fluid with a sorbent in the reaction zone under the reaction conditions to thereby remove sulfur from the hydrocarbon-containing fluid, wherein the sorbent comprises a reduced-valence promoter metal component and zinc oxide.

In another embodiment of the present invention, there is provided a process for cracking and desulfurizing a hydrocarbon-containing fluid. The cracking/desulfurization process comprises the steps of: (a) contacting the hydrocarbon-containing fluid with a solid particulate system in a reaction zone under reaction conditions sufficient to provide a cracked/desulfurized fluid and a deactivate solid particulate system, wherein the solid particulate system comprises an FCC catalyst and a sulfur sorbent; (b) contacting the deactivated solid particulate system with an oxygen-containing regeneration stream in a regeneration zone under regeneration conditions sufficient to provide a regenerated solid particulate system; and (c) contacting the regenerated solid particulate system with a hydrogen-containing reducing stream in a reducing zone under reducing conditions sufficient to provide a reduced solid particulate system.

In still another embodiment of the present invention, a system of solid particulates is provided. The solid particulate system comprises a mixture of fluid FCC catalyst particulates and sorbent particulates, wherein the sorbent particulates comprise a reduced-valence promoter metal component and zinc oxide.

DETAILED DESCRIPTION OF THE PREFERRED EMBODIMENTS

Figure 1:
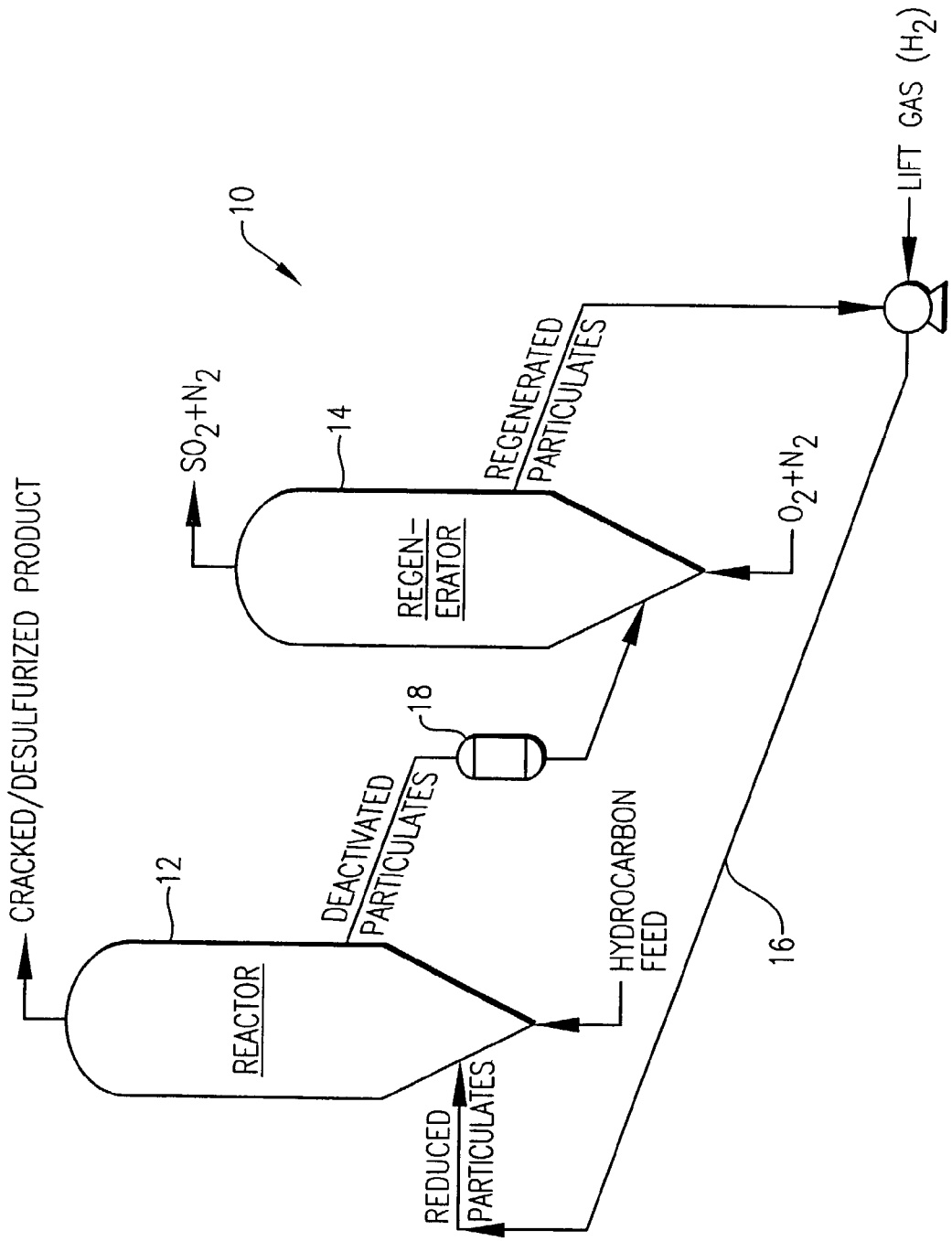
FIG. 1 is a schematic diagram of an integrated FCC/desulfurization unit constructed in accordance with the principles of the present invention.

Referring initially to FIG. 1, an integrated FCC/desulfurization unit 10 is illustrated as generally comprising a reactor 12, a regenerator 14, and a reducer 16. Reactor 12, regenerator 14, and reducer 16 can be any type of conduits, vessels, or systems known in the art wherein finely divided solid particulates can be contacted with a fluid stream under controlled contacting conditions, for example, a riser reactor or a fluidized bed reactor. Preferably, reactor 12 is a riser reactor wherein finely divided solid particulates can become entrained in a fluid flowing upwardly through a riser tube and then separated from the fluid via one or more cyclones located downstream from the riser tube. Preferably, regenerator 14 is a fluidized bed reactor wherein a fluid flows upwardly through and fluidizes a bed of finely divided solid particulates and the particulates are thereafter separated from the flowing fluid by gravitational force and/or by one or more cyclone(s). Reducer 16 is preferably a pneumatic lift assembly that employs a hydrogen-containing lift gas to transfer the solid particulates through a conduit from regenerator 14 to reactor 12.

In reactor 12, a system of finely divided solid particulates is contacted with a hydrocarbon-containing fluid under reaction conditions. The system of finely divided solid particulates comprises a mixture of conventional FCC catalyst particulates and reduced sorbent particulates. Preferably, the weight ratio of the FCC catalyst particulates to the sorbent particulates in the solid particulate system is in the range of from about 0.1:1 to about 100:1, more preferably in the range of from about 0.5:1 to about 50:1, and most preferably in the range of from 1:1 to 10:1.

The FCC catalyst particulates employed in FCC/desulfurization unit 10 can be any sufficiently fluidizable, circulatable, and regenerable conventional FCC catalyst having sufficient cracking activity and sufficient attrition resistance under the conditions in FCC/desulfurization unit 10. Amorphous FCC catalysts, such as those of the silica-alumina or silica-magnesia types, are suitable. However, the preferred FCC catalysts are those of the zeolite-type which comprise about 0.5 to about 50 weight percent, and preferably about 3 to about 30 weight percent, of a zeolitic crystalline aluminosilicate or borosilicate component distributed throughout a porous matrix. The zeolite-type FCC catalysts are preferred because of their high catalytic activity and their thermal stability. The zeolite can be of any type which is known to be useful in catalyzing the cracking of hydrocarbons. As listed above, such zeolites include faujasite, chabazite, mordenite, Zeolite X, Zeolite Y, Zeolite ZSM-5, the ultra-stable large-pore zeolites, and the borosilicate Zeolite AMS-1B. The preferred zeolites are those having a faujasite-type crystal structure such as natural faujasite, Zeolite X, Zeolite Y, and the ultra-stable large-pore zeolites. The most preferred zeolite is Zeolite Y. Since these zeolites are usually prepared or occur naturally in the sodium form, they are generally subjected to a single equilibrium ion exchange with hydrogen, ammonium, or rare earth metal ions to impart added activity and stability. A highly preferred zeolite is an exhaustively-exchanged rare-earth-form of one of the above-listed types. The most preferred zeolite is an exhaustively-exchanged rare-earth-form Y-type zeolite. The matrix of the zeolite-type cracking catalyst is a porous refractory material within which the zeolite component is dispersed. Suitable matrix materials can be either synthetic or naturally occurring and include silica, alumina, magnesia, zinc oxide, titania, calcium oxide, boria, bauxite, natural and treated clays, kieselguhr, diatomaceous earth, kaolin, mullite and mixtures thereof. A preferred matrix is one comprising a free form of an inorganic oxide selected from the group consisting of the oxides of aluminum, magnesium, zinc, titanium, and calcium. A more preferred matrix is a silica-alumina containing greater than about 80 percent, most preferably greater than about 90 percent, alumina. The presence of a very minor amount of silica is desired for the improved physical properties it imparts to the matrix.

The reduced solid sorbent particulates employed in FCC/desulfurization unit 10 can be any sufficiently fluidizable, circulatable, and regenerable metal oxide-based composition having sufficient desulfurization activity and sufficient attrition resistance under the conditions in FCC/desulfurization unit 10. A description of such a sorbent composition is provided in U.S. patent application Ser. No. 09/580,611 and U.S. patent application Ser. No. 10/072,209, the entire disclosures of which are incorporated herein by reference. The reduced solid sorbent particulates contacted with the hydrocarbon-containing stream in reactor 12 preferably initially (i.e., immediately prior to contacting with the hydrocarbon-containing fluid stream) comprise zinc oxide and a reduced-valence promoter metal component. Though not wishing to be bound by theory, it is believed that the reduced-valence promoter metal component of the reduced solid sorbent particulates facilitates the removal of sulfur from the hydrocarbon-containing stream, while the zinc oxide operates as a sulfur storage mechanism via its conversion to zinc sulfide.

The reduced-valence promoter metal component of the reduced solid sorbent particulates preferably comprises a promoter metal selected from the group consisting of nickel, cobalt, iron, manganese, tungsten, silver, gold, copper, platinum, zinc, tin, ruthenium, molybdenum, antimony, vanadium, iridium, chromium, palladium. More preferably, the reduced-valence promoter metal component comprises nickel as the promoter metal. As used herein, the term "reduced-valence" when describing the promoter metal component, shall denote a promoter metal component having a valence which is less than the valence of the promoter metal component in its common oxidized state. More specifically, the reduced solid sorbent particulates employed in reactor 12 should include a promoter metal component having a valence which is less than the valence of the promoter metal component of the regenerated (i.e., oxidized) solid sorbent particulates exiting regenerator 14. Most preferably, substantially all of the promoter metal component of the reduced solid sorbent particulates has a valence of 0.

In a preferred embodiment of the present invention the reduced-valence promoter metal component comprises, consists of, or consists essentially of, a substitutional solid metal solution characterized by the formula: $M_A Zn_B$, wherein M is the promoter metal and A and B are each numerical values in the range of from 0.01 to 0.99. In the above formula for the substitutional solid metal solution, it is preferred for A to be in the range of from about 0.70 to about 0.97, and most preferably in the range of from about 0.85 to about 0.95. It is further preferred for B to be in the range of from about 0.03 to about 0.30, and most preferably in the range of from about 0.05 to 0.15. Preferably, B is equal to (1-A).

Substitutional solid solutions have unique physical and chemical properties that are important to the chemistry of the sorbent composition described herein. Substitutional solid solutions are a subset of alloys that are formed by the direct substitution of the solute metal for the solvent metal atoms in the crystal structure. For example, it is believed that the substitutional solid metal solution ($M_A Zn_B$) found in the reduced solid sorbent particulates is formed by the solute zinc metal atoms substituting for the solvent promoter metal atoms. There are three basic criteria that favor the formation of substitutional solid solutions: (1) the atomic radii of the two elements are within 15 percent of each other; (2) the crystal structures of the two pure phases are the same; and (3) the electronegativities of the two components are similar. The promoter metal (as the elemental metal or metal oxide) and zinc oxide employed in the solid sorbent particulates described herein preferably meet at least two of the three criteria set forth above. For example, when the promoter metal is nickel, the first and third criteria, are met, but the second is not. The nickel and zinc metal atomic radii are within 10 percent of each other and the electronegativities are similar. However, nickel oxide (NiO) preferentially forms a cubic crystal structure, while zinc oxide (ZnO) prefers a hexagonal crystal structure. A nickel zinc solid solution retains the cubic structure of the nickel oxide. Forcing the zinc oxide to reside in the cubic structure increases the energy of the phase, which limits the amount of zinc that can be dissolved in the nickel oxide structure. This stoichiometry control manifests itself microscopically in a 92:8 nickel zinc solid solution ($Ni_{0.92} Zn_{0.08}$) that is formed during reduction and microscopically in the repeated regenerability of the solid sorbent particulates.

In addition to zinc oxide and the reduced-valence promoter metal component, the reduced solid sorbent particulates employed in reactor 12 may further comprise a porosity enhancer and an aluminate. The aluminate of the reduced solid sorbent particulates preferably comprises, consists essentially of, or consists of a promoter metal-zinc aluminate substitutional solid solution characterized by the formula: $M_Z Zn_{(1-Z)} Al_2 O_4$, wherein M is the promoter metal and Z is a numerical value in the range of from 0.01 to 0.99. The porosity enhancer, when employed, can be any compound which ultimately increases the macroporosity of the solid sorbent particulates. Preferably, the porosity enhancer is perlite. The term "perlite" as used herein is the petrographic term for a siliceous volcanic rock which naturally occurs in certain regions throughout the world. The distinguishing feature, which sets it apart from other volcanic minerals, is its ability to expand four to twenty times its original volume when heated to certain temperatures. When heated above 1600° F., crushed perlite expands due to the presence of combined water with the crude perlite rock. The combined water vaporizes during the heating process and creates countless tiny bubbles in the heat softened glassy particles. It is these diminutive glass sealed bubbles which account for its light weight. Expanded perlite can be manufactured to weigh as little as 2.5 lbs per cubic foot. Typical chemical analysis properties of expanded perlite are: silicon dioxide 73%, aluminum oxide 17%, potassium oxide 5%, sodium oxide 3%, calcium oxide 1%, plus trace elements. Typical physical properties of expanded perlite are: softening point 1600-2000° F., fusion point 2300° F.-2450° F., pH 6.6-6.8, and specific gravity 2.2-2.4. The term "expanded perlite" as used herein refers to the spherical form of perlite which has been expanded by heating the perlite siliceous volcanic rock to a temperature above 1600° F. The term "particulate expanded perlite" or "milled perlite" as used herein denotes that form of expanded perlite which has been subjected to crushing. The term "milled expanded perlite" is intended to mean the product resulting from subjecting expanded perlite particles to milling or crushing.

The reduced solid sorbent particulates initially contacted with the hydrocarbon-containing fluid stream in reactor 12 can comprise zinc oxide, the reduced-valence promoter metal component ($M_A Zn_B$), the porosity enhancer (PE), and the promoter metal-zinc aluminate ($M_Z Zn_{(1-Z)} Al_2 O_4$) in the ranges provided below in Table 1.

TABLE 1

Components of the Reduced Solid Sorbent Particulates

| Range | ZnO (wt %) | $M_A Zn_B$ (wt %) | PE (wt %) | $M_Z Zn_{(1-Z)} Al_2 O_4$ (wt %) |
|---|---|---|---|---|
| Preferred | 5-80 | 5-80 | 2-50 | 1-50 |
| More Preferred | 20-60 | 10-60 | 5-30 | 5-30 |
| Most Preferred | 30-60 | 15-40 | 10-25 | 10-20 |

The physical properties of the FCC catalyst particulates and sorbent particulates which significantly affect the solid particulate system's suitability for use in FCC/desulfurization unit 10 include, for example, particle shape, particle size, particle density, and resistance to attrition. The particulates of the solid particulate system (i.e., the mixture of FCC catalyst particulates and reduced sorbent particulates) employed in FCC/desulfurization unit 10 preferably comprise substantially microspherical particles having a mean particle size in the range of from about 20 to about 150 microns, more preferably in the range of from about 50 to about 100 microns, and most preferably in the range of from 60 to 80 microns. As used herein, the term "finely divided" denotes particles having a mean particle size less than 500 microns. The density of the particulates is preferably in the range of from about 0.5 to about 1.5 grams per cubic centimeter (g/cc), more preferably in the range of from about 0.8 to about 1.3 g/cc, and most preferably in the range of from 0.9 to 1.2 g/cc. The particle size and density of the particulates preferably qualify the solid sorbent particulates as a Group A solid under the Geldart group classification system described in *Powder Technol.*, 7, 285-292 (1973). The particulates preferably have high resistance to attrition. As used herein, the term "attrition resistance" denotes a measure of a particle's resistance to size reduction under controlled conditions of turbulent motion. The attrition resistance of a particle can be quantified using the Davison Index. The Davison Index represents the weight percent of the over 20 micrometer particle size fraction which is reduced to particle sizes of less than 20 micrometers under test conditions. The Davison Index is measured using a jet cup attrition determination method. The jet cup attrition determination method involves screening a 5 gram sample of particulates to remove particles in the 0 to 20 micrometer size range. The particles above 20 micrometers are then subjected to a tangential jet of air at a rate of 21 liters per minute introduced through a 0.0625 inch orifice fixed at the bottom of a specially designed jet cup (1" I.D.×2" height) for a period of 1 hour. The Davison Index (DI) is calculated as follows:

$$DI = \frac{\text{Wt. of } 0 - 20 \text{ Micrometer Formed During Test}}{\text{Wt. of Original} + 20 \text{ Micrometer Fraction Being Tested}} \times 100 \times \text{Correction Factor}$$

The correction factor (currently 0.30) can be determined using a known calibration standard to adjust for jet cup dimensions and wear. The particulates employed in the present invention preferably have a Davison Index value of less than about 30, more preferably less than about 20, and most preferably less than 10.

The hydrocarbon-containing fluid stream contacted with the solid particulate system (i.e., the FCC catalyst particulates and the reduced sorbent particulates) in reactor 12 preferably comprises a sulfur-containing hydrocarbon fluid. Preferably, the sulfur-containing hydrocarbon has a boiling point above about 400° F. Examples of suitable sulfur-containing hydrocarbons include light gas oils, heavy gas oils, wide-cut gas oils, vacuum gas oils, fuel oils, decanted oils, slurry oils, naphthas, residual fractions, cycle oils derived from any of these, and mixtures thereof. The amount of atomic sulfur in the sulfur-containing hydrocarbon fluid suitable for use in the inventive desulfurization process is generally greater than about 50 parts per million by weight (ppmw) of the sulfur-containing hydrocarbon fluid, more preferably in a range of from about 100 ppmw atomic sulfur to about 10,000 ppmw atomic sulfur, and most preferably from 150 ppmw atomic sulfur to 500 ppmw atomic sulfur. It is preferred for at least about 50 weight percent of the atomic sulfur present in the sulfur-containing hydrocarbon fluid employed in the present invention to be in the form of organosulfur compounds. More preferably, at least about 75 weight percent of the atomic sulfur present in the sulfur-containing hydrocarbon fluid is in the form of organosulfur compounds, and most preferably at least 90 weight percent of the atomic sulfur is in the form of organosulfur compounds. As used herein, "sulfur" used in conjunction with "ppmw sulfur" or the term "atomic sulfur", denotes the amount of atomic sulfur (about 32 atomic mass units) in the sulfur-containing hydrocarbon, not the atomic mass, or weight, of a sulfur compound, such as an organosulfur compound.

As used herein, the term "sulfur" denotes sulfur in any form normally present in a sulfur-containing hydrocarbon. Examples of such sulfur which can be removed from a sulfur-containing hydrocarbon fluid through the practice of the present invention include, but are not limited to, hydrogen sulfide, carbonal sulfide (COS), carbon disulfide ($CS_2$), mercaptans (RSH), organic sulfides (R—S—R), organic disulfides (R—S—S—R), thiophene, substitute thiophenes, organic trisulfides, organic tetrasulfides, benzothiophene, alkyl thiophenes, alkyl benzothiophenes, alkyl dibenzothiophenes, and the like, and combinations thereof, as well as heavier molecular weights of the same which are normally present in sulfur-containing hydrocarbons of the types contemplated for use in the process of the present invention, wherein each R can by an alkyl, cycloalkyl, or aryl group containing 1 to 10 carbon atoms.

It is preferred for the hydrocarbon-containing fluid stream to be combined with a co-feed fluid prior to entering the reaction zone of reactor 12. The co-feed fluid is preferably a gaseous hydrogen-containing fluid such as, for example, hydrogen or steam. The molar ratio of hydrogen (from the co-feed fluid) to hydrocarbon (from the hydrocarbon-containing fluid) is preferably in the range of from about 0.1:1 to about 3:1, most preferably 0.2:1 to 1:1.

In reactor 12 the finely divided solid particulate system (comprising the FCC catalyst particulates and the reduced sorbent particulates) is contacted with the gaseous hydrocarbon-containing fluid stream under a set of reaction conditions sufficient to produce a cracked/desulfurized hydrocarbon and a deactivated solid particulate system. The reaction conditions in reactor 12 include temperature, pressure, and FCC catalyst to hydrocarbon weight ratio. The preferred ranges for such reaction conditions are provided below in Table 2.

TABLE 2

| | Reaction Conditions | | |
| Range | Temp (° F.) | Press. (psig) | Cat.:HC (wt. ratio) |
| --- | --- | --- | --- |
| Preferred | 600-1500 | <0-3000 | 1:1-50:1 |
| More Preferred | 800-1200 | 0-1000 | 3:1-30:1 |
| Most Preferred | 900-1100 | 10-200 | 5:1-20:1 |

When the FCC catalyst particulates of the solid particulate system are contacted with the hydrocarbon-containing fluid stream in reactor 12 under reaction conditions, high boiling point hydrocarbon molecules are "cracked" to form lighter, lower boiling point hydrocarbon molecules. The degree of such cracking can be measured as a "cracking conversion level," defined herein as the percentage reduction (by weight) of hydrocarbons boiling above 430° F. The FCC catalyst and reaction conditions employed in reactor 12 are preferably sufficient to provide a cracking conversion level of at least about 20 percent, more preferably at least about 40 percent, still more preferably at least about 60 percent, and most preferably at least 80 percent. During contacting of the FCC catalyst particulates with the hydrocarbon-containing fluid stream in reactor 12, coke builds up on the surface of the FCC catalyst particulates, thereby deactivating the FCC catalyst particulates. Such coke is removed in regenerator 14, as described below.

When the reduced sorbent particulates are contacted with the hydrocarbon-containing stream in reactor 12 under reaction conditions, sulfur compounds, particularly organosulfur compounds, present in the hydrocarbon-containing fluid stream are removed from such fluid stream. At least a portion of the sulfur removed from the hydrocarbon-containing fluid stream is employed to convert at least a portion of the zinc oxide of the reduced sorbent particulates into zinc sulfide, thereby forming a sulfur-loaded (i.e., deactivated) sorbent. In contrast to many conventional sulfur removal processes, it is preferred that substantially none of the sulfur in the sulfur-containing hydrocarbon fluid is converted to, and remains as, hydrogen sulfide during desulfurization in reactor 12. Rather, it is preferred that the cracked/desulfurized effluent from reactor 12 comprises less than the amount of hydrogen sulfide, if any, in the fluid feed charged to reactor 12. The cracked/desulfurized fluid effluent from reactor 12 preferably contains less than about 50 weight percent of the amount of sulfur in the hydrocarbon-containing fluid feed charged to reactor 12, more preferably less than about 20 weight percent of the amount of sulfur in the hydrocarbon-containing fluid feed, and most preferably less than 5 weight percent of the amount of sulfur in the hydrocarbon-containing fluid feed. It is preferred for the total sulfur content of the cracked/desulfurized fluid effluent from reactor 12 to be less than about 50 parts per million by weight (ppmw) of the fluid effluent, more preferably less than about 30 ppmw, still more preferably less than about 15 ppmw, and most preferably less than 10 ppmw.

After cracking and desulfurization in reactor 12, at least a portion of the particulates of the resulting deactivated solid particulate system are transported to a reactor stripper 18 where hydrocarbons from reactor 12 are removed from the deactivated particulate system with an inert stripping fluid such as, for example, nitrogen. The particulates of the stripped deactivated solid particulate system are then transported to regenerator 14. In regenerator 14, particulates of the deactivated solid particulate are contacted with an oxygen-containing regeneration stream at regeneration conditions. The preferred ranges for such regeneration conditions in regenerator 14 are provided below in Table 3.

TABLE 3

Regeneration Conditions

| Range | Temp (° F.) | Press. (psig) |
|---|---|---|
| Preferred | 600-1500 | <0-3000 |
| More Preferred | 800-1200 | 0-1000 |
| Most Preferred | 900-1100 | 10-200 |

The oxygen-containing regeneration stream employed in regenerator 14 preferably comprises at least 1 mole percent oxygen and a gaseous diluent. More preferably, the oxygen-containing regeneration stream comprises in the range of from about 1 to about 50 mole percent oxygen and in the range of from about 50 to about 95 mole percent nitrogen, still more preferable in the range of from about 2 to about 20 mole percent oxygen and in the range of from about 70 to about 90 mole percent nitrogen, and most preferably in the range of from 3 to 10 mole percent oxygen and in the range of from 75 to 85 mole percent nitrogen.

When the deactivated (i.e., coke-loaded) FCC catalyst particulates are contacted in regenerator 14 with the oxygen-containing regeneration stream under the regeneration conditions described above, at least a portion, preferably a substantial portion, of the coke deposited on the surface of the deactivated FCC catalyst particulates is combusted (i.e., "burned off") to thereby provide a regenerated FCC catalyst.

When the deactivated (i.e., sulfur-loaded) solid sorbent particulates are contacted in regenerator 14 with the oxygen-containing regeneration stream under the regeneration conditions described above, at least a portion of the zinc sulfide of the sulfur-loaded solid sorbent particulates is converted into zinc oxide via contacting with the oxygen-containing regeneration stream and at least a portion of the promoter metal component is oxidized to form an oxidized promoter metal component. Preferably, in regenerator 14 at least a portion of the substitutional solid metal solution ($M_A Zn_B$) and/or a sulfided substitutional solid metal solution ($M_A Zn_B S$) of the sulfur-loaded sorbent is converted to a substitutional solid metal oxide solution characterized by the formula: $M_X Zn_Y O$, wherein M is the promoter metal and X and Y are each numerical values in the range of from 0.01 to about 0.99. In the above formula, it is preferred for X to be in the range of from about 0.5 to about 0.9 and most preferably from 0.6 to 0.8. It is further preferred for Y to be in the range of from about 0.1 to about 0.5, and most preferably from 0.2 to 0.4. Preferably, Y is equal to (1−X).

The regenerated (i.e., oxidized) solid sorbent particulates exiting regenerator 14 can comprise zinc oxide, the oxidized promoter metal component ($M_X Zn_Y O$), the porosity enhancer (PE), and the promoter metal-zinc aluminate ($M_Z Zn_{(1-Z)} Al_2 O_4$) in the ranges provided below in Table 4.

TABLE 4

Components of the Regenerated Solid Sorbent Particulates

| Range | ZnO (wt %) | $M_X Zn_Y O$ (wt %) | PE (wt %) | $M_Z Zn_{(1-Z)} Al_2 O_4$ (wt %) |
|---|---|---|---|---|
| Preferred | 5-80 | 5-70 | 2-50 | 1-50 |
| More Preferred | 20-60 | 10-60 | 5-30 | 5-30 |
| Most Preferred | 30-60 | 15-40 | 10-25 | 10-20 |

After regeneration in regenerator 14, the particulates of the resulting regenerated solid particulate system are transported to reducer 16. In reducer 16, the regenerated solid particulates are contacted with a hydrogen-containing reducing stream (i.e., lift gas) under reducing conditions. The preferred ranges for such reducing conditions in reducer 16 are provided below in Table 5.

TABLE 5

Reducing Conditions

| Range | Temp (° F.) | Press. (psig) |
|---|---|---|
| Preferred | 600-1300 | <0-3000 |
| More Preferred | 800-1200 | 0-1000 |
| Most Preferred | 900-1100 | 10-200 |

The hydrogen-containing reducing stream (i.e., lift gas) employed in reducer 16 preferably comprises at least 50 mole percent hydrogen with the remainder being cracked hydrocarbon products such as, for example, methane, ethane, and propane. More preferably, the hydrogen-containing reducing stream comprises at least about 70 mole percent hydrogen, and most preferably at least 80 mole percent hydrogen.

When the regenerated solid sorbent particulates are contacted with the hydrogen-containing reducing stream in reducer 16 under the reducing conditions described above, at least a portion of the oxidized (i.e., unreduced) promoter metal component is reduced to form the reduced-valence promoter metal component. Preferably, at least a substantial portion of the substitutional solid metal oxide solution ($M_X Zn_Y O$) is converted to the substitutional solid metal solution ($M_A Zn_B$).

After the solid particulates have been reduced in reducer 16, the resulting reduced solid particulate system can be reintroduced to reactor 12 for contacting with the hydrocarbon-containing fluid stream in reactor 12.

Reasonable variations, modifications, and adaptations may be made within the scope of this disclosure and the appended claims without departing from the scope of this invention.

What is claimed is:

1. A process for simultaneously cracking and desulfurizing a hydrocarbon-containing fluid in a common reaction zone, said process comprising the steps of:
   (a) contacting said hydrocarbon-containing fluid with a cracking catalyst in said reaction zone under reaction conditions sufficient to crack said hydrocarbon-containing fluid; and
   (b) contacting said hydrocarbon-containing fluid with a sorbent in said reaction zone under said reaction conditions to thereby remove sulfur from said hydrocarbon-containing fluid, wherein said sorbent comprises a reduced-valence promoter metal component and zinc oxide, wherein said sorbent has a Davison Index value that is less than 10.

2. A process in accordance with claim 1, wherein said sorbent comprises perlite.

3. A process in accordance with claim 1, wherein said reduced-valence promoter metal component comprises a substitutional solid metal solution characterized by the formula $M_A Zn_B$, wherein M is a promoter metal and A and B are each numerical values in the range of 0.01 to 0.99.

4. A process in accordance with claim 1, wherein said reduced-valence promoter metal component is nickel.

5. A process in accordance with claim 1, wherein the weight ratio of said cracking catalyst to said sorbent in said reaction zone is in the range of from about 0.5:1 to about 50:1.

6. A process in accordance with claim 1, wherein said reaction conditions are sufficient to provide a cracking conversion level of at least 20 percent and wherein said reaction conditions are sufficient to reduce the sulfur content of the hydrocarbon-containing fluid at least 50 percent.

* * * * *